United States Patent Office 3,575,722
Patented Apr. 20, 1971

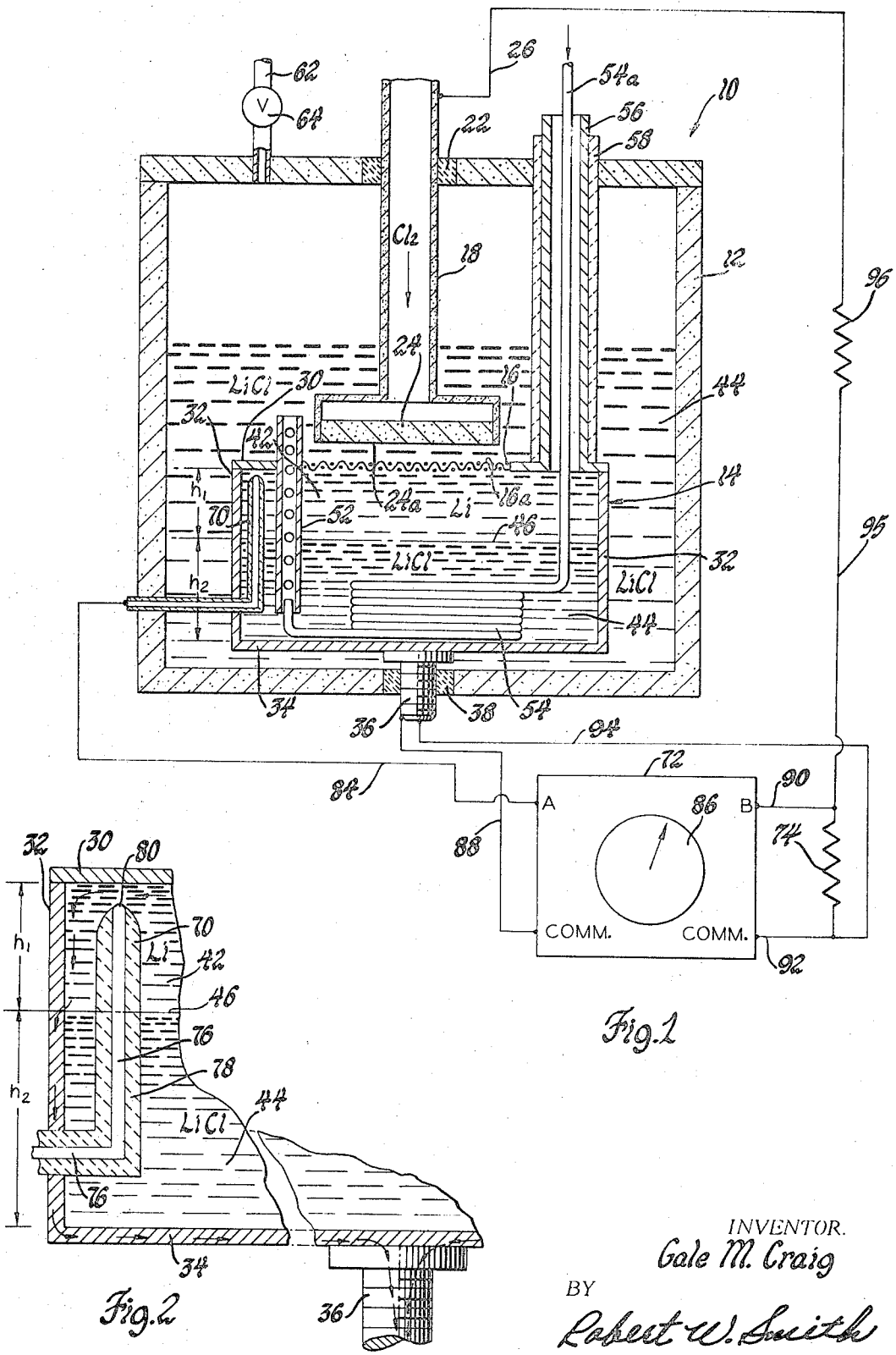

3,575,722
LEVEL INDICATOR FOR CONDUCTIVE LIQUIDS
Gale M. Craig, Anderson, Ind., assignor to General
Motors Corporation, Detroit, Mich.
Filed Mar. 19, 1969, Ser. No. 808,612
Int. Cl. H01m 27/00
U.S. Cl. 136—86        2 Claims

ABSTRACT OF THE DISCLOSURE

A liquid level indicator measures the level of a conductive liquid contained in a metallic reservoir. A sidewall portion of the reservoir is included in a current conductive path supplied by a source of current applied to one end of the reservoir. A measuring system monitors both the voltage drop produced by current flow through a portion of the reservoir sidewall and also the value of current which produces the voltage drop. The ratio of the amount of voltage drop to the value of current flow is measured to determine the resistance of the sidewall portion not in contact with conductive liquid to give an indication of the level of the conductive liquid.

---

This invention is related to liquid level indicators and more particularly to a liquid level indicator for measuring the height of a conductive liquid contained in a conductive reservoir.

In a liquid metal fuel cell disclosed in my copending application S.N. 557,954, now abandoned for a Fuel Cell Electrode, filed June 16, 1966 and assigned to the assignee of this invention, a liquid metal reactant material is contained within a metallic reservoir forming part of one of the two electrodes of the fuel cell. The reservoir contains two liquids in which one is the reactant material which is highly conductive and the other material is relatively nonconductive. Each liquid has a different specific gravity so that one of the liquids floats on the other liquid along a liquid interface. When the fuel cell discharges current, the reactant material within the reservoir undergoes a chemical reaction at an active electrode surface formed at one end of the reservoir. As the reactant is used up, it is displaced in the reservoir by the nonconductive material. A buoyant force between the liquids in the reservoir maintains the reactant liquid in contact with the active electrode surface. The amount of liquid metal reactant left in the fuel cell determines the state of charge or charge level of the fuel cell. Heretofore, the charge level of the fuel cell is determined by recording the time and amount of current which is discharged from the fuel cell.

In the present invention, a direct indication of the level of the liquid reactant material is provided and, therefore, the charge level of the fuel cell is readily known. The liquid level indicator includes a measuring system that includes an insulated electrical probe which extends within the reservoir and has an exposed electrical contact immersed in the conductive reactant material. The probe is connected to a voltage ratio measuring means which includes two inputs. The first input is connected across a voltage developed between the probe contact and the opposite end of the reservoir. The voltage is developed by current flow through the portion of the resevoir sidewall adjacent the nonconductive liquid. The second input is connected across a current shunt formed by a resistance connected in series with the fuel cell output terminals.

The fuel cell discharge current flows from an active electrode surface through the conductive reactant material to the liquid interface and then through the sidewalls of the reservoir to an external terminal. As the electrochemical action progresses, the volume of the conductive reactant material decreases and is replaced by the nonconductive liquid material. Accordingly, the height of the reservoir sidewall in contact with the nonconductive liquid increases so that the resistance of the current path increases. The discharge current flow varies with the discharge rate of the fuel cell and also the same current flow produces both of the voltages applied to the voltage ratio measuring means. Accordingly, the ratio of the two inputs produces an indication in which the variations in current are cancelled. The indication of the measuring means is thereby directly proportional to the ratio of the resistances provided by the reservoir wall and the current shunt. The resistance of current shunt has a fixed predetermined value so that variations in the indications are caused by the change in resistance along the sidewall of the reservoir. This change in indication is provided as the nonconductive liquid displaces the conductive reactant material. Accordingly, an indication of the level of the reactant material is provided which directly corresponds to the charge level of the fuel cell.

It is an object of this invention to provide a liquid level indicator which provides an indication of the quantity of conductive liquid contained in a conductive reservoir.

A further object of this invention is to provide a liquid level measuring system for a reservoir containing a conductive material which is displaced by a nonconductive liquid and develops a voltage drop along the sides of the reservoir which are in contact with the nonconductive liquid when a source of current is applied in series with the reservoir side.

A still further object of this invention is to provide a liquid level indicator in a fuel cell having a reservoir containing a conductive liquid which floats on a nonconductive liquid. A probe in contact with the conductive liquid is provided to measure a voltage developed between the top and bottom of the reservoir by current discharged by the fuel cell. Fluctuations in voltage due to variations in current are cancelled by measuring the ratio of the voltage drop through a sidewall of the reservoir and the voltage developed by the discharge current across a fixed resistance. The measured voltage ratio provides an indication of the resistance of the reservoir wall that is in contact with the nonconductive liquid.

Other objects and features of this invention should become apparent from the following detailed description taken in conjunction with the following drawing in which:

FIG. 1 illustrates a sectional view of a fuel cell and a schematic circuit diagram of the liquid level indicator of this invention for indicating a liquid level within the fuel cell.

FIG. 2 is an enlarged partial view of FIG. 1 illustrating the mounting of the probe included in the liquid level indicator of this invention.

Referring now to the drawings wherein FIG. 1 illustrates a schematic circuit diagram of the liquid level indicator of this invention and a fuel cell generally designated 10 constructed in accordance with my copending application S.N. 557,954, now abandoned for a Fuel Cell Electrode, filed June 16, 1966, and assigned to the assignee of this invention. The fuel cell includes a liquid metal reactant, a gaseous oxidizing reactant and a molten salt electrolyte. This is a regenerative type fuel cell since the metal reactant is recovered from the electrolyte when a reverse current flow is applied to the cell from an external electrical source. It is contemplated that the measuring system of the liquid level indicator of my invention may be employed in environments other than the fuel cell 10 illustrated in FIG. 1 which is now described hereinafter.

The fuel cell 10 includes a container 12 formed of dense carbon material. A reservoir 14, also referred to as a fuel electrode, is suitably mounted within the container 12. The reservoir 14 forms one of the electrodes of the fuel cell and provides a receptacle for the liquid metal reactant. The top of the reservoir 14 includes an active electrode section 16 described further hereinbelow.

The second electrode of the fuel cell includes a feed tube 18 made of a carbon graphite material which is electrically insulated from the container 12 by a ceramic insulator 22. The tube 18 terminates in a second active electrode end portion 24 whereby the tube 18 provides a conductive path between a conductor means 26 and the active electrode portion 24. The feed tube also provides a conduit for passing the oxidizing reactant which is chlorine gas from outside the fuel cell to the active electrode portion. The end portion 24 is made of a porous carbon material which provides an oppositely poled active electrode surface 24a mounted in an opposing relationship to the surface 16a of the electrode section 16.

The reservoir 14 is formed by a cylindrical tank made of an electrically conductive material, such as stainless steel. The tank forming reservoir 14 includes a top portion 30, a cylindrical sidewall portion 32 and a bottom end portion 34. The top portion 30 includes the active electrode section 16 which is formed by a porous metal section including a metallic screen or metal felt material also made of stainless steel. The bottom end 34 of the reservoir includes a current collecting terminal formed by a stud 36 in electrical contact with the reservoir end.

The terminal stud 36 provides an output terminal of one polarity for connecting the fuel cell to an external electrical circuit including the measuring system of my invention, as described in detail hereinbelow. A ceramic insulator 38 insulates the stud 36 from the fuel cell container 12. The conductor means 26 provides a current conductive path between the active electrode portion 24 of tube 18 and includes an opposite polarity output terminal (not shown) which provides a connection with an external electrical circuit.

The reservoir 14 contains two liquid materials in which one is the liquid metal reactant designated 42 which is liquid lithium and the second liquid is a molten salt consisting of lithium chloride designated 44. The ratio of the specific gravity of lithium chloride to lithium is greater than unity. Therefore, the liquid lithium 42 floats on top of the lithium chloride 44 within the reservoir 14. Also, lithium chloride is substantially electronically nonconductive relative to the electronic conductivity of liquid lithium 42. The conductivity referred to herein is meant to include free electron or electronic conduction rather than ionic conduction which accompanies the electrochemical reactions occurring in the region including both active electrodes 16 and 24 during the operation of the fuel cell 10.

A liquid interface 46 is formed between the lithium 42 and lithium chloride 44 within the reservoir 14. The height $h1$ illustrated in FIG. 1 is the height of the sidewall 32 in contact with the lithium 42 between top portion 30 and the liquid interface 46. The height $h2$ is the height of the sidewall 32 in contact with the lithium chloride between the interface 46 and the bottom portion 34.

The lithium chloride 44 also surrounds the outside of reservoir 14 including the region between the active electrode surfaces 16a and 24a and forms the electrolytic material of the fuel cell. The region including the active electrodes 16 and 24 and the electrolyte material therebetween is the region, wherein the fuel cell electrochemical reactions take place.

The fuel cell 10 further includes a pump arrangement to maintain a pressure differential across the electrode section 16. The pressure differential controls the buoyancy between the lithium 42 and lithium chloride 44 which forces the lithium 42 to continuously wet the porous metal of section 16. The pump arrangement also controls the admission and expulsion of the lithium chloride from the reservoir 14. As the lithium is consumed and reformed respectively during discharge and recharge of the fuel cell the lithium chloride fills the volume of the reservoir 14 not filled by the lithium. A lift tube 52 is connected with an inert gas admission tube 54 extending through a stem portion 56 connected with an opening in the top portion 30 of reservoir 14. The outer portion of the stem 56 is coated with an insulating ceramic material 58. An inert gas such as argon is applied at one end 54a of the admission tube 54. An outlet for the return gas is provided by the exhaust tube 62 having a valve 64. A percolating action takes place in lift tube 52 which is controlled by the amount of inert gas applied through tube 54 and vented through exhaust tube 62 as explained in further detail in my above-identified copending application.

The liquid level indicator of this invention includes a probe 70, a voltage ratio measuring means 72 and a current shunt formed by a resistor 74 having a predetermined and fixed resistance value. The probe 70 is illustrated in the enlarged view of FIG. 2 and includes an electrical conductor 76 inside the probe which is surrounded by a ceramic insulating material 78 such as aluminum oxide. One end of the conductor 76 is exposed to provide an electrical contact 80. The probe 70 is mounted within the reservoir 14 so that the contact 80 is spaced from the top portion 30 of the reservoir and is immersed in the liquid lithium 42. The opposite end of the probe 70 extends through the sidewall 32 of the reservoir and also through the container 12 and outside the fuel cell 10. The probe conductor 76 is connected to an external conductor 84 illustrated in FIG. 1. Accordingly, an external electrical connection is provided to the conductive liquid lithium by the electrical probe 70.

The voltage ratio measuring means 72 includes a D.C. voltage ratio measuring meter circuit having an indicator dial 86. The indicator dial 86 is responsive to the ratio of two voltages connected respectively across two voltage inputs provided in the measuring means 72. One suitable device for the measuring means 72 is a Voltmeter/Ratiometer Model 3420A/B manufactured by the Hewlett Packard Instrument Company. This meter has two voltage inputs. The first input is provided by terminals designated A and Common and the second is provided by terminals designated B and Common. Across the A to Common input is connected the conductor 84 also connected to probe conductor 76 and a conductor designated 88 which is connected to the terminal stud 36. Across the B to Common input is connected, respectively, conductors 90 and 92 which are connected to opposite ends of the resistor 74. The resistor 74 is connected as a current shunt element in series with conductors 94 and 95 connected between terminal stud 36 and one side of an external electrical load indicated as a resistor 96 in FIG. 1. The conductor 26 completes the external fuel cell connections.

FIG. 2 illustrates arrows which indicate the path of the fuel cell discharge current through a portion of the reservoir sidewall 32. The active electrode section 16 provided in the top portion 30 of the reservoir 14 provides a source of electrons for the external electrical circuit connected to the fuel cell 10. The electrochemical reactions occurring between the active electrode portions 16 and 24 and within the electrolyte between the active electrodes provide electrons at the electrode 16. The electrons flow out of the fuel cell because of the voltage potential established across the fuel cell external terminals.

Since the liquid lithium is highly conductive, having a conductivity in the order of $45 \times 10^{-6}$ ohm-cm., the electrons flow from the electrode section 16 through the lithium toward the stud terminal 36. The path of electron flow is illustrated by the arrows in FIG. 2. When the electron flow reaches the liquid interface 46 they migrate toward the section of the sidewall 32 having the height $h2$ that is between the interface 46 and the bottom 34 of the reservoir. This is because the lithium chloride has a relatively high resistivity, relative to the liquid lithium 44 and sidewall 32, which is in the order of 0.17 ohm-cm. The sidewall portion 32 is formed of a stainless steel material having a thickness of approximately one-sixteenth inch in one embodiment. The overall height $(h1+h2)$ of the reservoir is approximately five inches and the diameter of the cylindrical sidewall portion is also approximately five inches. Since the stainless steel sidewall 32 is substantially more conductive than the lithium chloride, the current flows along the portion $h2$ of the sidewall 32. A voltage drop is developed between the interface 46 and the terminal 36 due to the resistance of the sidewall material and the fuel cell discharge current. The current density in the sidewall 32 reaches a high value since the fuel cell is capable of producing an output current level of 400 amperes.

Referring now to the operation of the liquid level indicator of my invention wherein when the fuel cell 10 is fully charged the reservoir 14 is substantially filled with lithium. A small amount of lithium chloride is present in the bottom of the reservoir. Accordingly, the height $h1$ of the lithium 42 is substantially greater than the height $h2$ so that the fuel cell discharge current flows through a short distance of the sidewall 32. When the fuel cell becomes substantially discharged, the height $h2$ of the lithium chloride 44 is substantially greater than the height $h1$ of the lithium 42 whereby the current flows for a substantial distance along the sidewall 32. Accordingly, in the latter condition the voltage drop produced along the sidewall 32 is greater than the voltage drop when the fuel cell is substantially fully charged.

The probe contact 80 is connected by the conductive lithium, which provides a negligible voltage drop, to the liquid interface 46 along sidewall 32. The contact end 80 is connected through conductor 84 to terminal A of the voltage ratiometer 72. The bottom 34 of the reservoir 14 is connected through terminal 36 and conductors 88 and 94–92 to the Common terminals of the voltage ratiometer 72. The resistances of these two connections are substantially equal. Accordingly, changes in potential developed across conductors 84 and 88 are provided by the changes in voltage drop developed across the wall portion $h2$ of sidewall 32. This, of course, is the portion of sidewall 32 in contact with the lithium chloride 44. The fuel cell discharge current flows out of the terminal 36 and through the current shunt resistor 74. The fixed resistance of the resistor 74 thereby develops a voltage potential across conductors 90 and 92.

The indicator dial 86 indicates the ratio of the voltages applied across the A to Common and B to Common inputs of the voltage ratiometer 72. The changes of voltage potential across the first input is developed by the fuel cell output current flow multiplied times the resistance of the sidewall portion 32 having a height $h2$. The potential developed across the second input is equal to the fuel cell output current flow multiplied times the resistance of resistor 74. By measuring the ratio of these two voltages the output current factor is cancelled and the meter dial 86 produces an indication dependent upon the ratio of the two aforementioned resistances. Also, since the resistance of resistor 74 is known, the variations of dial 86 is directly related to the change in the resistance of sidewall 32 which changes with the height $h2$ of lithium chloride. The variations in current generated by the fuel cell, with changes in the external electrical load connected across the fuel cell, do not affect the indications provided by the ratiometer 72, as noted hereinabove.

The dial 86 may be calibrated to provide a reading in "ampere-hours" of charge remaining in the fuel cell. This is possible since the height $h1$ of the lithium reactant is directly related to the charge level of the fuel cell. For example, one cubic centimeter of lithium is equivalent to approximately two ampere-hours of the fuel cell's charge level. The total volume of the reservoir 14 being known and the volume of lithium being dependent upon the height $h1$ of lithium along the reservoir sidewall 32, the change in resistance along wall height $h2$ directly corresponds to the volume of lithium. Therefore, the indicator dial 86 may be provided with an indicia reading in ampere-hour units to provide an indication of the state of charge of the fuel cell 10.

Also, the indicator dial 86 can be used to indicate both discharging and charging conditions if the meter is arranged with a null point corresponding to the fuel cell being in a substantially fully charged state. This is when the lithium reactant substantially fills the reservoir 14. The voltage potential is reversed across the two inputs to the voltage ratio measuring means or ratiometer 72 when the fuel cell is recharged by an external electrical source. In the latter instance the lithium chloride electrolyte disassociates respectively into lithium and chlorine molecules. The lithium molecules flow back into the reservoir and the interface 46 is lowered by the pump arrangement until the lithium substantially fills the reservoir. During the recharge cycle, the direction of electron flow through the external circuit of the fuel cell is reversed. Accordingly, the value of resistance voltage drop developed along the sidewall 32 is the same but provides a reverse polarity indication on the dial 86 from that provided during discharge of the fuel cell 10.

The probe contact 80 is purposely spaced from the top reservoir end 30 so that a gap is provided which is only partially filled with lithium when the quantity of lithium becomes critically low. This causes the contact 80 to become covered by lithium chloride and the voltage normally developed across the first voltage input of the voltage ratiometer 72 will drop to substantially zero. A sudden deflection in the indicator dial 86 will occur to operate an alarm or fuel cell disconnect apparatus (not shown) which is actuated by the indicator dial 86, for example. It is to be understood if provision for an alarm feature is not desired the probe contact 80 can be attached directly to the top end 30 near the electrode section 16.

The present invention provides a means of measuring the quantity of conductive and nonconductive liquids in an electrically conductive reservoir 14 having a source of electrons supplied at one end of the reservoir. Changes in resistance are detected across the sidewall portion 32 of the reservoir which is in contact with the nonconductive liquid. The voltage developed by the current flow along the reservoir sidewall is compared to the voltage developed in a current shunt element in series with a source of electrons so that measurement of the ratio of the two voltages is unaffected by variations in the current flow. It is further contemplated that my invention may incorporate a simple alarm device or shut-off control means in combination with a voltage ratio measuring means 72 which is actuated at a lower charge level limit of the fuel cell. Also, the relationship of the conductive and nonconductive liquids may be reversed from that illustrated between liquids 42 and 44 in FIG. 1 in the case where conductive liquid 42 is heavier than nonconductive liquid 44. Also the shape of the reservoir 14 may differ substantially and also provide a sidewall portion adapted for providing a resistance voltage drop to the measuring system of my invention which corresponds to the level of a liquid contained by the reservoir.

Other modifications will be obvious to those skilled in the art, upon a study of this disclosure, and are readily applicable without departing from the essential features of my invention.

What is claimed is:

1. In combination, a fuel cell and a liquid level indicator system for detecting the level of a conductive liquid reactant material in said fuel cell, said liquid level indicator system comprising: and enclosed reservoir of electrically conductive material containing said conductive liquid reactant, the level of said liquid reactant within said reservoir varying as electrochemical reactions occur in said fuel cell; a source of electrical current being provided by said electrochemical reactions, one pole of said source of electrical curent being conected to one end of said reservoir which contains said liquid reactant; an electrical output terminal connected to an end of said reservoir which is opposite said end containing the liquid reactant; an electrical probe extending through said conductive material of said reservoir and insulated therefrom, said probe including an electrical contact which is positioned inside of said reservoir so that it is immersed in said conductive liquid reactant; a resistor; means connecting said resistor in series with said output terminal and the opposite pole of said source of electrical current whereby said resistor develops a voltage proportional to the current developed by said current source; a voltage ratio measuring means including a pair of voltage inputs and an indicating means; means connecting one of said pair of voltage inputs across said probe electrical contact and said electrical output terminal; means connecting the other of said pair of voltage inputs across said resistor means, said indicating means being responsive to a sudden change in the ratio of the voltages appearing across said pair of inputs when the change is caused by a predetermined decreased level in said conductive liquid reactant so that said probe electrical contact is not immersed in the liquid reactant wherein said decreased reactant level corresponds to a predetermined low charge level condition of said fuel cell.

2. In combination, a fuel cell and a liquid level indicator system for measuring the level of a liquid metal reactant in said fuel cell, said liquid level indicator system comprising: an enclosed reservoir of electrically conductive material including a sidewall portion and opposite end portions, said reservoir being filled by a conductive liquid metal reactant and a nonconductive liquid wherein said liquid metal reactant floats on said nonconductive liquid; a source of electrical current being provided by electrochemical reactions occurring within said fuel cell and having one polarity of said source connected with one of said reservoir end portions; a pair of oppositely poled output conductor means connecting said fuel cell output to an external electrical load circuit, one of said output conductor means including an electrical output terminal connected to the other of said opposite end portions of said reservoir; an insulated electrical probe extending through said sidewall portion of said reservoir and insulated therefrom, said probe including an electrical contact which is positioned inside of said reservoir and toward one end of said reservoir so that the probe is immersed in said conductive liquid metal reactant and said electrical contact is electrically connected with the portion of said sidewall in contact with said conductive liquid meal reactant; a resistor; means connecting said resistor in series with said pair of output conductor means whereby said resistor develops a voltage proportional to the current output provided by said fuel cell current source; an electrical measuring means including an indicator and a pair of voltage inputs; means connecting one of said pair of voltage inputs across said probe electrical contact and said electrical output terminal; means connecting the other of said pair of voltage inputs across said resistor means, said indicator of said electrical measuring means being responsive to the ratio of the voltages appearing across said pair of voltage inputs, whereby said indicator produces an indication of the resistance of said reservoir sidewall portion in contact with said nonconductive liquid to provide an indication corresponding to the level of said conductive liquid metal reactant which is proportionally related to the charge level of said fuel cell.

References Cited
UNITED STATES PATENTS

| | | | |
|---|---|---|---|
| 3,488,224 | 1/1970 | Craig | 136—86 |
| 3,496,023 | 2/1970 | Craig | 136—86 |

WINSTON A. DOUGLAS, Primary Examiner

H. A. FEELEY, Assistant Examiner